US011956702B2

(12) United States Patent
Balmakhtar et al.

(10) Patent No.: US 11,956,702 B2
(45) Date of Patent: Apr. 9, 2024

(54) USER EQUIPMENT (UE) SERVICE OVER A NETWORK EXPOSURE FUNCTION (NEF) IN A WIRELESS COMMUNICATION NETWORK

(71) Applicant: T-Mobile Innovations LLC, Overland Park, KS (US)

(72) Inventors: Marouane Balmakhtar, Fairfax, VA (US); Lyle T. Bertz, Lee's Summit, MO (US); Robert Keith Butler, Overland Park, KS (US); Mark Richard Bales, Lee's Summit, MO (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 319 days.

(21) Appl. No.: 17/323,197

(22) Filed: May 18, 2021

(65) Prior Publication Data

US 2022/0377514 A1 Nov. 24, 2022

(51) Int. Cl.
*H04W 36/00* (2009.01)
*H04W 4/50* (2018.01)
*H04W 4/60* (2018.01)
*H04W 8/24* (2009.01)
*H04W 48/18* (2009.01)

(52) U.S. Cl.
CPC .............. *H04W 4/50* (2018.02); *H04W 4/60* (2018.02); *H04W 8/24* (2013.01); *H04W 36/0022* (2013.01); *H04W 48/18* (2013.01)

(58) Field of Classification Search
CPC ........... H04W 4/50; H04W 4/60; H04W 8/24; H04W 36/0022; H04W 48/18; H04W 8/10; H04W 88/14; H04L 67/50; Y02D 30/70
See application file for complete search history.

(56) References Cited

U.S. PATENT DOCUMENTS

| 10,299,128 | B1 | 5/2019 | Suthar et al. |
| 10,462,840 | B2 | 10/2019 | Dao et al. |
| 10,791,508 | B2 | 9/2020 | Park et al. |
| 10,856,265 | B2 | 12/2020 | Ryu |
| 10,863,494 | B2 | 12/2020 | Zhang et al. |
| 2019/0021064 | A1 | 1/2019 | Ryu et al. |
| 2019/0174449 | A1 | 6/2019 | Shan et al. |
| 2020/0252900 | A1 | 8/2020 | Kim et al. |

FOREIGN PATENT DOCUMENTS

| EP | 3429129 A1 * | 1/2019 | ............. G06F 9/547 |
| WO | 2018232253 A1 | 12/2018 | |
| WO | WO-2019139118 A1 * | 7/2019 | ............. H04L 47/11 |
| WO | 2019223638 A1 | 11/2019 | |
| WO | WO-2021057969 A1 * | 4/2021 | ............. G06F 9/547 |

* cited by examiner

*Primary Examiner* — Joseph E Dean, Jr.

(57) ABSTRACT

A wireless communication network serves User Equipment (UEs) over a Third Generation Partnership Project (3GPP) Network Exposure Function (NEF). The wireless communication network comprises a non-3GPP Interworking Function (IWF) and the 3GPP NEF. The non-3GPP IWF receives NEF Application Programming Interface (API) calls that have UE data from the UEs over non-3GPP access nodes. The non-3GPP IWF transfers the NEF API calls that have the UE data to the 3GPP NEF. The 3GPP NEF receives the NEF API calls that have the UE data from the non-3GPP IWF. The 3GPP NEF exposes the UE data to an Application Functions (AF) in response to the NEF API calls.

20 Claims, 11 Drawing Sheets

USER EQUIPMENT (UE) SERVICE OVER A NETWORK EXPOSURE FUNCTION (NEF) IN A WIRELESS COMMUNICATION NETWORK

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smart-phone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Interworking Functions (IWFs), Access and Mobility Management Functions (AMFs), Session Management Functions (SMFs), User Plane Functions (UPFs), Network Exposure Functions (NEFs), Application Functions (AFs), and the like.

The NEFs communicate with the other network elements to expose events and implement network capabilities. The NEFs and the AFs have an Application Programming Interface (API) framework to control the exposure of the events and the implementation of the network capabilities. The AFs are linked to external Application Servers (AS) that subscribe to the exposed events and services capabilities. The AS is often operated by a large operator that uses the AF and NEF to control services for a multitude of their affiliated wireless user devices. The NEF API calls from the AF allow the external AS to perform UE monitoring, device triggering, background data transfer, parameter provisioning, packet flow description management, traffic influence, chargeable party control, and NEF session quality. Unfortunately, the wireless user devices do not effectively interact with the NEF. Moreover, the wireless communication networks do not efficiently use secure network links to support the interaction between the wireless user devices and the NEFs.

TECHNICAL OVERVIEW

A wireless communication network serves User Equipment (UEs) over a Third Generation Partnership Project (3GPP) Network Exposure Function (NEF). The wireless communication network comprises a non-3GPP Interworking Function (IWF) and the 3GPP NEF. The non-3GPP IWF receives NEF Application Programming Interface (API) calls that have UE data from the UEs over non-3GPP access nodes. The non-3GPP IWF transfers the NEF API calls that have the UE data to the 3GPP NEF. The 3GPP NEF receives the NEF API calls that have the UE data from the non-3GPP IWF. The 3GPP NEF exposes the UE data to an Application Function (AF) in response to the NEF API calls.

DETAILED DESCRIPTION

Figure 1:
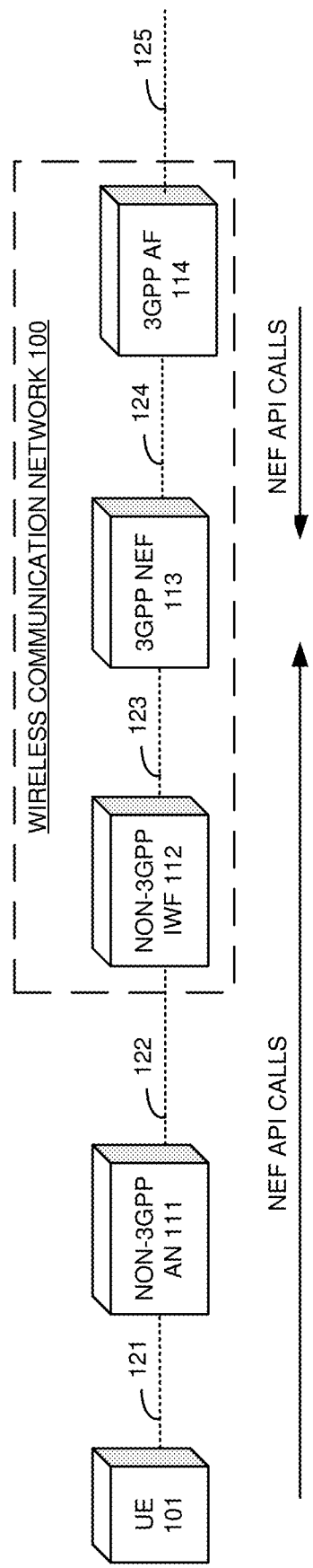
FIG. 1 illustrates a wireless communication network that serves User Equipment (UEs) over a Third Generation Partnership Project (3GPP) Network Exposure Function (NEF).

FIG. 1 illustrates wireless communication network 100 that serves User Equipment (UE) 101 over Third Generation Partnership Project (3GPP) Network Exposure Function (NEF) 113. UE 101 comprises a computer, phone, vehicle, sensor, robot, or some other data appliance with data communication circuitry. Wireless communication network 100 comprises non-3GPP Interworking Function (IWF) 112, 3GPP NEF 113, and 3GPP Application Function (AF) 114. UE 101 is linked to non-3GPP IWF 112 over non-3GPP Access Node (AN) 111. Additional network functions like Access and Mobility Management Function (AMF), Session Management Function (SMF), and User Plane Function (UPF) are typically present but are omitted for clarity. Wireless communication network 100 is simplified and typically includes more UEs, access nodes, IWFs, NEFs, and AFs than shown.

Various examples of network operation and configuration are described herein. In some examples, UE 101 generates and transfers NEF Application Programming Interface (API) calls that have UE data to non-3GPP IWF 112 over non-3GPP AN 111. Non-3GPP IWF 112 receives the NEF API calls from UE 101 over non-3GPP AN 111. Non-3GPP IWF 112 transfers the NEF API calls that have the UE data to 3GPP NEF 113. Non-3GPP NEF 113 receives the NEF API calls that have the UE data from non-3GPP IWF 112. NEF 114 also receives NEF API calls from AF 114. In response to the NEF API calls from UE 101 and AF 114, 3GPP NEF 113 exposes the UE data to AF 114. AF 114 may transfer the UE data to external data systems like application servers.

In some examples, non-3GPP IWF 113 transfers the NEF API calls to 3GPP NEF 114 over a direct IWF-to-NEF link. In other examples, non-3GPP IWF 113 transfers the NEF API calls to 3GPP NEF 114 over a 3GPP Access and Mobility Management Function (AMF) and possibly over a 3GPP Session Management Function (SMF). In yet other examples, non-3GPP IWF 113 transfers the NEF API calls to 3GPP NEF 114 over a 3GPP User Plane Function (UPF). UE 101 may transfer the NEF API calls in Non-Access Stratum (NAS) files that traverse a 3GPP N1 link. In some examples, non-3GPP IWF 112 authenticates and authorizes UE 101 for NEF API calls before transferring API calls from UE 101 to 3GPP NEF 113. For example, IWF 112 may compare UE ID hash results from UE 101 with expected UE ID hash results for authentic UE 101. In some examples, non-3GPP IWF 112 transfers the NEF API calls to 3GPP NEF 113 over a wireless network slice and/or Data Network Name (DNN) that is selected for UE 101 and configured to securely transfer NEF API calls from UE 101 to 3GPP NEF 113.

Advantageously, UE 101 effectively interacts with NEF 113. Moreover, wireless communication network 100 efficiently uses secure network links 121-123 to support interaction between the UE 101 and NEF 113. UE 101 communicates with non-3GPP access node 111 over technologies like Institute of Electrical and Electronic Engineers (IEEE) 802.3 (Ethernet), IEEE 802.11 (WIFI), Bluetooth, or some other data communication protocol. UE 101 communicates with non-3GPP IWF 112 over non-3GPP access node 111 using technologies like Internet Protocol (IP) and 5G core signaling. Communication links 121-125 use metallic wiring, glass fibers, radio channels, or some other communication media. The data links use Ethernet, Time Division Multiplex (TDM), Data Over Cable System Interface Specification (DOCSIS), WIFI, IP, General Packet Radio Service Transfer Protocol (GTP), WIFI, virtual switching, inter-processor communication, bus interfaces, and/or some other data communication protocols. UE 101, access node 111, IWF 112, NEF 113, and AF 114 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
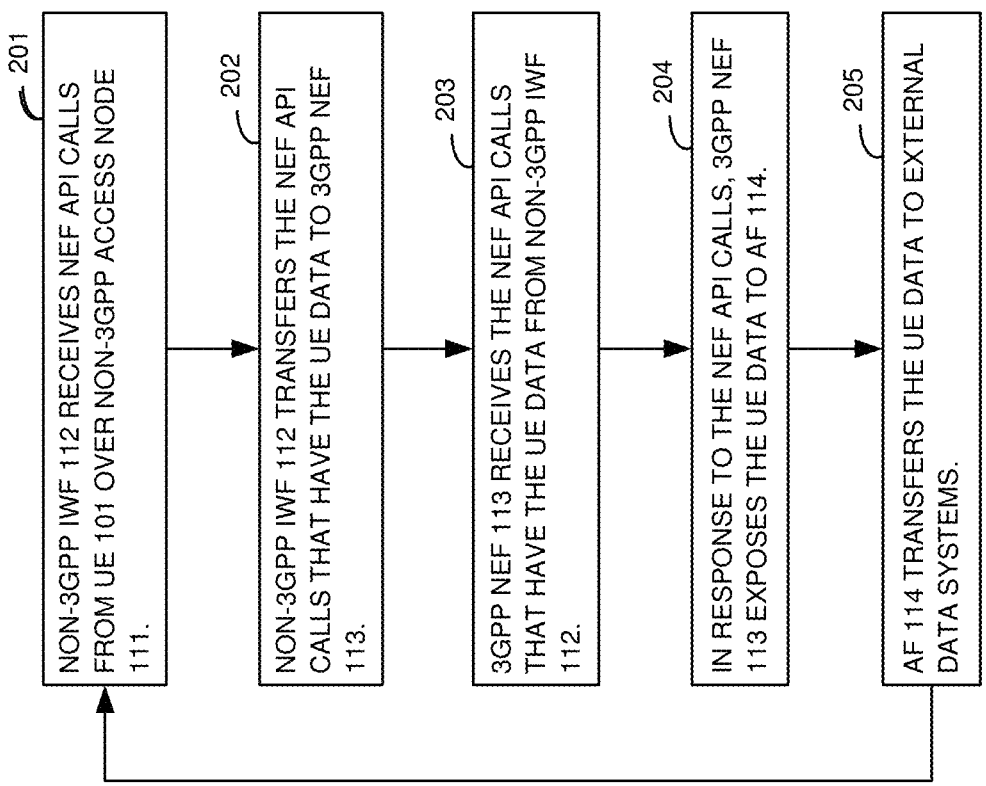
FIG. 2 illustrates an exemplary operation of the wireless communication network to serve the UEs over the 3GPP NEF.

FIG. 2 illustrates an exemplary operation of wireless communication network 100 to serve UE 101 over 3GPP NEF 113. The operation may differ in other examples. Non-3GPP IWF 112 receives NEF API calls from UE 101 over non-3GPP AN 111 (201). Non-3GPP IWF 112 transfers the NEF API calls that have the UE data to 3GPP NEF 113 (202). 3GPP NEF 113 receives the NEF API calls that have the UE data from non-3GPP IWF 112 (203). In response to the NEF API calls, 3GPP NEF 113 exposes the UE data to AF 114 (204). AF 114 transfers the UE data to external data systems (205). The operation repeats (201).

Figure 3:
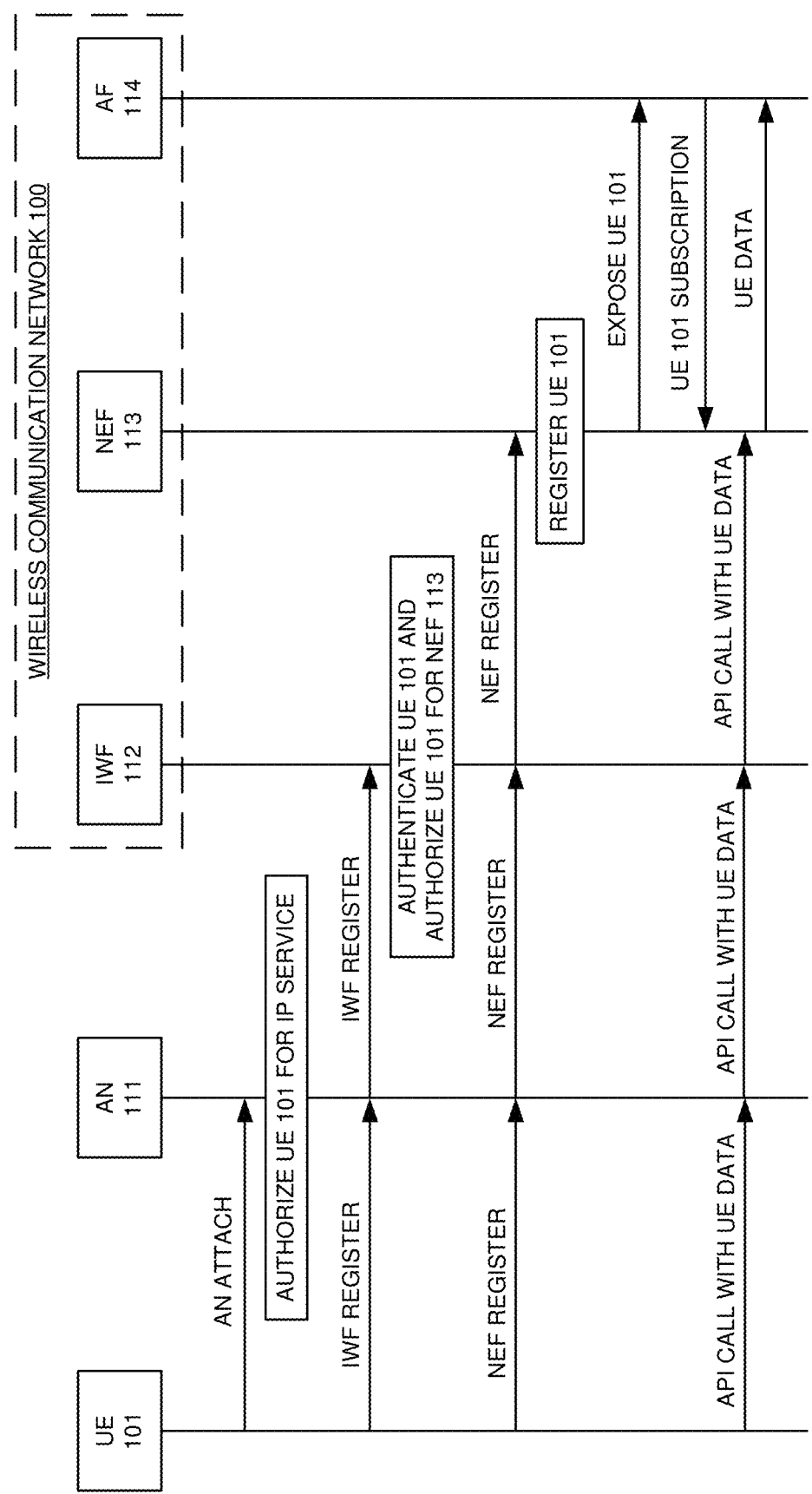
FIG. 3 illustrates an exemplary operation of the wireless communication network to serve the UEs over the 3GPP NEF.

FIG. 3 illustrates an exemplary operation of wireless communication network 100 to serve UE 101 over 3GPP NEF 113. The operation may differ in other examples. UE 101 attaches to non-3GPP AN 111. UE 101 registers with non-3GPP IWF 112 over non-3GPP AN 111. Non-3GPP IWF 112 authenticates and authorizes UE 101 for NEF 113—perhaps with the support of an AMF other network function. UE 101 registers with 3GPP NEF 113 over AN 111 and IWF 112. 3GPP NEF 113 registers UE 101 for NEF service.

In response to the NEF registration by UE 101, 3GPP NEF 113 exposes UE 101 to AF 114, and AF 114 subscribes to UE 101 data. UE 101 generates and transfers NEF API calls that have UE data to non-3GPP IWF 112 over non-3GPP AN 111. Non-3GPP IWF 112 receives the NEF API calls from UE 101 over non-3GPP AN 111. Non-3GPP IWF 112 transfers the NEF API calls that have the UE data to 3GPP NEF 113. 3GPP NEF 113 receives the NEF API calls that have the UE data from non-3GPP IWF 112. In response to the NEF API calls, 3GPP NEF 113 exposes the UE data to AF 114. AF 114 may transfer the UE data to external data systems.

Figure 4:
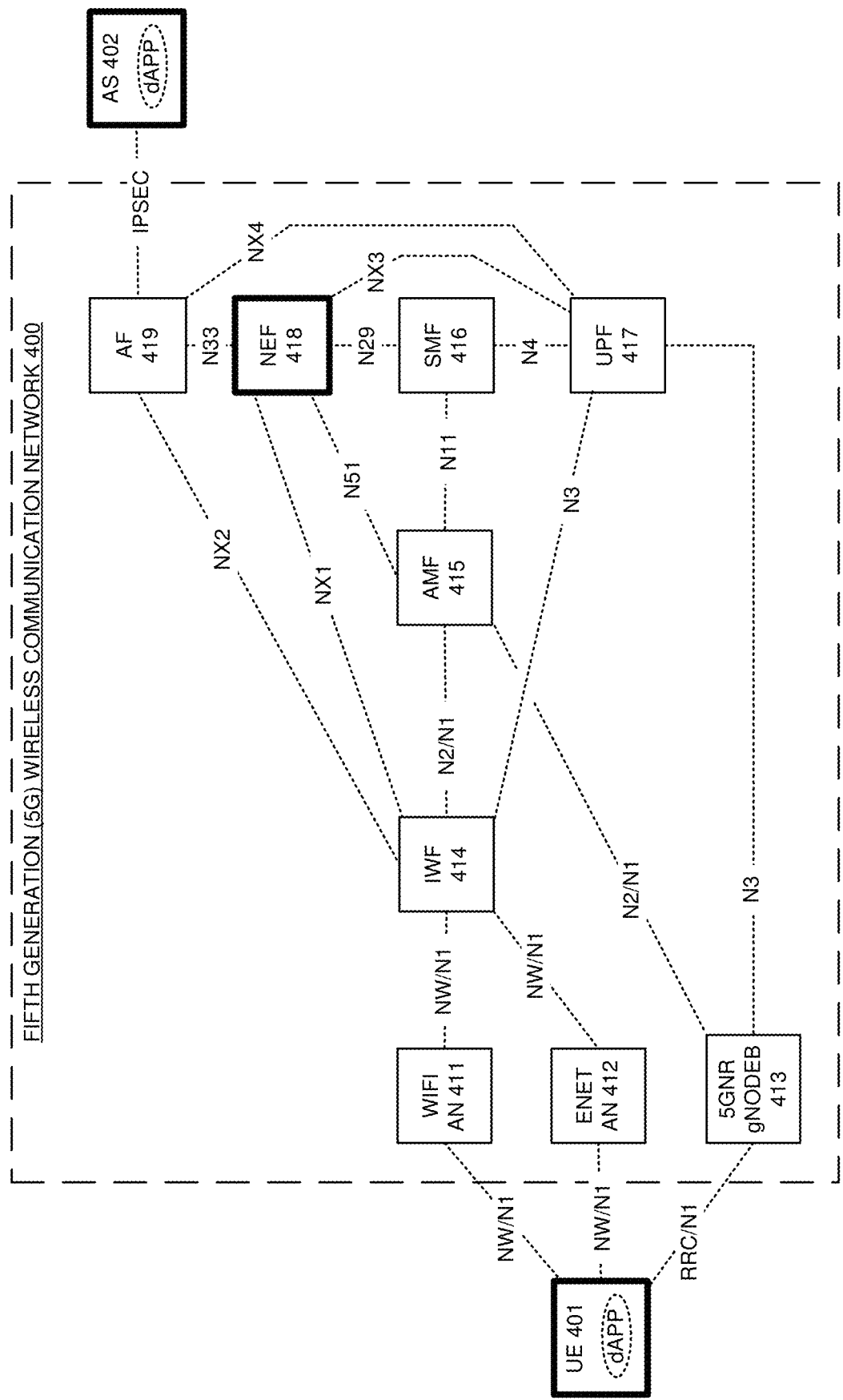
FIG. 4 illustrates a Fifth Generation (5G) wireless communication network to serve UEs over a 3GPP NEF.

FIG. 4 illustrates Fifth Generation (5G) wireless communication network 400 to serve UE 401 over 3GPP NEF 418. 5G wireless communication network 400 comprises an example of wireless communication network 100, although network 100 may differ. 5G wireless communication network 400 comprises: UE 401, WIFI Access Node (AN) 411, Ethernet (ENET) AN 412, 5GNR gNodeB 413, non-3GPP Interworking Function (IWF) 414, 3GPP Access and Mobility Management Function (AMF) 415, 3GPP Session Management Function (SMF) 416, 3GPP User Plane Function (UPF) 417, 3GPP NEF 418, and 3GPP Application Function (AF) 419.

UE 401 and Application Server (AS) 402 execute a distributed application (dAPP). UE 401 is linked to ANs 411-412 and gNodeB 413. AS 402 is linked to AF 419. UE 401 executes the dApp to generate and transfer NEF Application Programming Interface (API) calls that have UE data. The NEF API calls may be standard calls for UE 401 and/or other UEs like: UE monitoring, device triggering, background data transfer, parameter provisioning, packet flow description management, traffic influence, chargeable party control, and NEF session quality. The NEF API calls may be non-standard calls for UE 401 and/or the other UEs like dApp transactions between UE 401 and AS 402 through NEF 418 and AF 419.

UE 401 transfers the NEF API calls for delivery to NEF 418. Multiple API paths are avaiable:
UE 401-AN 411/412-IWF 414-NEF 418,
UE 401-AN 411/412-IWF 414-AF 419-NEF 418,
UE 401-AN 411/412-IWF 414-UPF 417-NEF 418,
UE 401-AN 411/412-IWF 414-UPF 417-AF 419-NEF 418,
UE 401-AN 411/412-IWF 414-AMF 415-NEF 418,
UE 401-AN 411/412-IWF 414-AMF 415-SMF 416-NEF 418,
UE 401-gNodeB 413-AMF 415-NEF 418,
UE 401-gNodeB 413-AMF 415-SMF 416-NEF 418,
UE 401-gNodeB 413-UPF 417-NEF 418, and
UE 401-gNodeB 413-UPF 417-AF 419-NEF 418.
When AMF 414 and/or SMF 416 are used, UE 401 may transfer the NEF API calls in Non-Access Stratum (NAS) files that traverse the 3GPP N1 link between UE 401 and AMF/SMF 414-415.

At least one of network functions 414-419 authenticates the identity of UE 401 and authorizes UE 401 for NEF API service. For example, AMF 415 may authenticate the identity of UE 401 through the exchange of random numbers and hash results. AMF 415 may select a Data Network Name (DNN) that includes SMF 416 and NEF 418 and/or a wireless network slice that includes UPF 417 and AF 419. In response to the NEF API calls, 3GPP NEF 418 may expose the UE data to AF 419, and AF 419 may transfer the UE data to AS 402 over a secure link like IPSEC.

Figure 5:
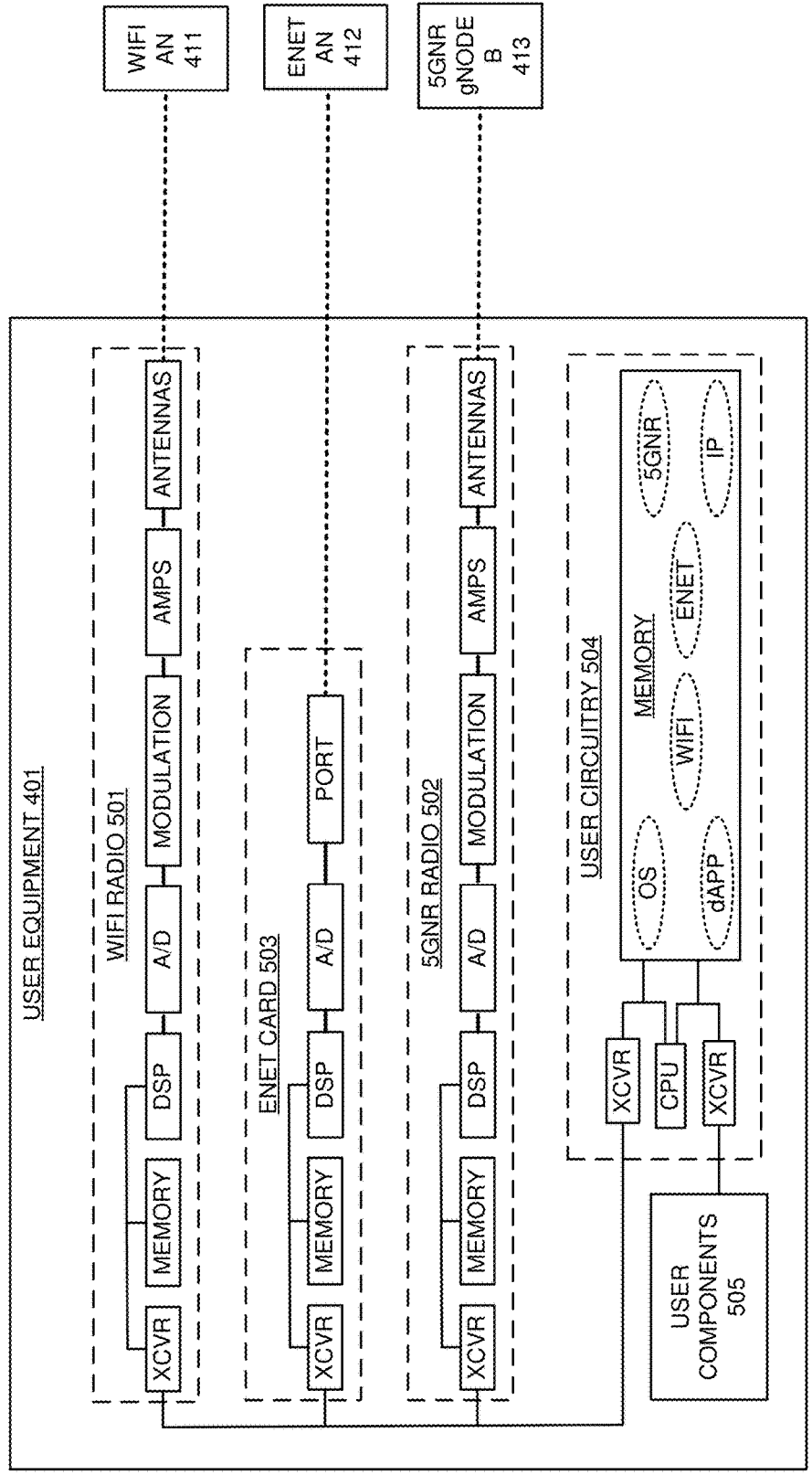
FIG. 5 illustrates a UE in the 5G wireless communication network.

FIG. 5 illustrates UE 401 in 5G wireless communication network 400. UE 401 comprises an example of UE 101, although UE 101 may differ. UE 401 comprises WIFI radio 501, 5GNR radio 502, Ethernet (ENET) card 503, user circuitry 504, and user components 505. Radios 501-502 comprises antennas, amplifiers, filters, modulation, analog-to-digital interfaces, DSP, memory, and transceivers that are coupled over bus circuitry. Ethernet card 503 comprises ports, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system, dAPP, and network applications for WIFI, ENET, 5GNR, and IP. The network applications comprise components like Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in WIFI radio 501 are wirelessly coupled to WIFI AN 411 over a WIFI link. The antennas in 5GNR radio 502 are wirelessly coupled to 5GNR gNodeB 413 over a 5GNR link. The port in ENET card 503 is wireline coupled to ENET AN 412 over an Ethernet link. Transceivers (XCVRs) in radios 501-502 and card 503 are coupled to transceivers in user circuitry 504. Transceivers in user circuitry 504 are coupled to user components 505 like displays, controllers, interfaces, and memory. The CPU in user circuitry 504 executes the operating system, dAPP, and network applications to exchange network signaling and user data with: WIFI AN 411 over WIFI radio 501, ENET AN 412 over ENET card 503, and 5GNR gNodeB 413 over 5GNR radio 502. In particular the dAPP transfers NEF API calls to NEF 418. In some examples, some of the WIFI, ENET, and 5GNR components could be omitted. UE 401 could be a WIFI-only device, WIFI/ENET device, 5GNR/WIFI device, or use some other technology combination device.

Figure 6:
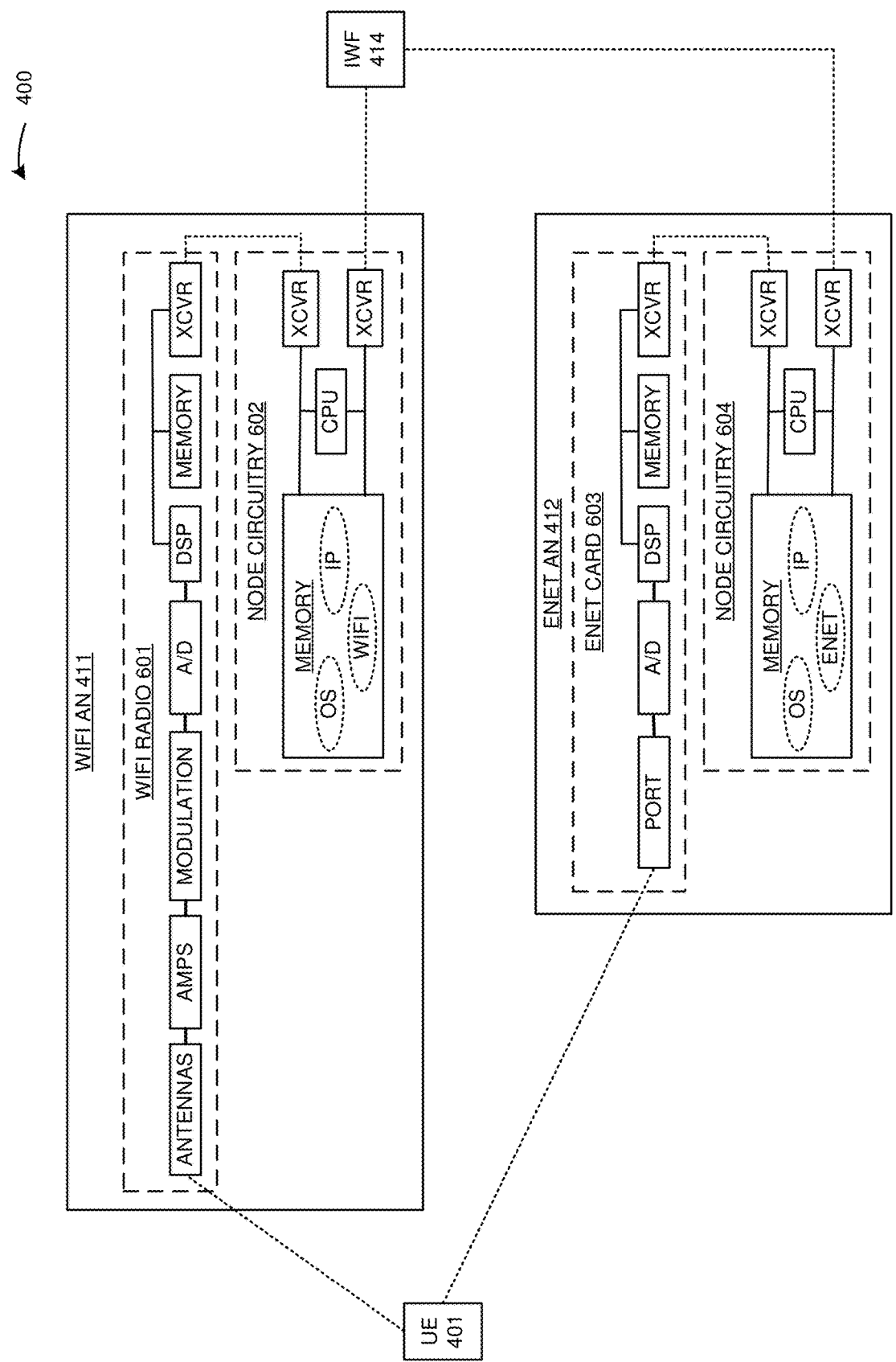
FIG. 6 illustrates non-3GPP access nodes in the 5G wireless communication network.

FIG. 6 illustrates non-3GPP ANs 411-412 in 5G wireless communication network 400. Non-3GPP access nodes 411-412 comprises an example of access nodes 111-112 although access nodes 111-112 may differ. WIFI AN 411 comprises WIFI radio 601 and node circuitry 602. WIFI radio 601 comprises antennas, amplifiers, filters, modulation, analog-to-digital interfaces, DSP, memory, and transceivers that are coupled over bus circuitry. Node circuitry 602 comprises memory, CPU, user interfaces and components, and transceivers that are coupled over bus circuitry. The memory in node circuitry 602 stores an operating system, user applications, and network applications for IP and WIFI. The antennas in WIFI radio 601 are wirelessly coupled to UE 401 over a WIFI link. Transceivers in WIFI radio 601 are coupled to transceivers in node circuitry 602. Transceivers in node circuitry 602 are coupled to transceivers in IWF 414. The CPU in node circuitry 602 executes the operating systems, user applications, and network applications to exchange network signaling and user data with UE 401 and with IWF 414.

ENET AN 412 comprises ENET card 603 and node circuitry 604. ENET card 603 comprises ports, analog-to-digital interfaces, DSP, memory, and transceivers that are coupled over bus circuitry. Node circuitry 604 comprises memory, CPU, user interfaces and components, and transceivers that are coupled over bus circuitry. The memory in node circuitry 604 stores an operating system, user applications, and network applications for IP and ENET. The ports in ENET card 603 are wireline coupled to UE 401 over an ENET link. Transceivers in ENET card 603 are coupled to transceivers in node circuitry 604. Transceivers in node circuitry 604 are coupled to transceivers in IWF 414. The CPU in node circuitry 604 executes the operating systems, user applications, and network applications to exchange network signaling and user data with UE 401 and with IWF 414.

Figure 7:
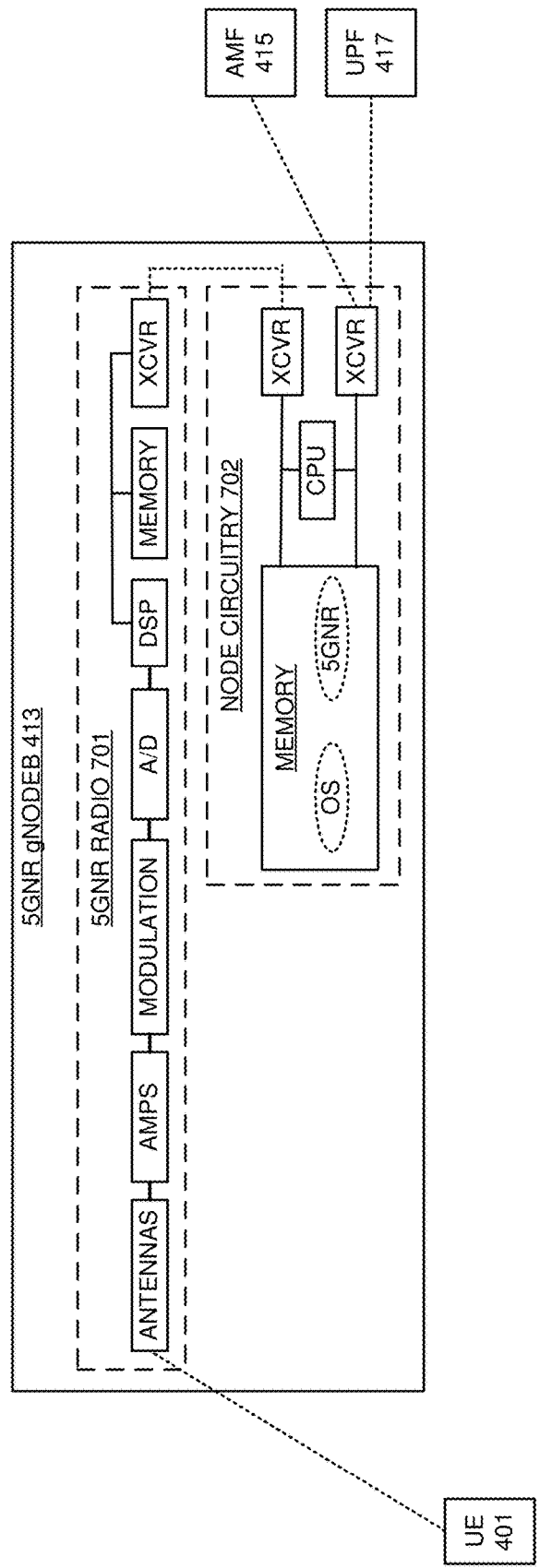
FIG. 7 illustrates a 5G New Radio (5GNR) gNodeB in the 5G wireless communication network.

FIG. 7 illustrates 5G New Radio (5GNR) gNodeB 413 in 5G wireless communication network 400. 5GNR gNodeB 413 comprises 5GNR radio 701 and node circuitry 702. 5GNR radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system, user applications, and network applications for IP and 5GNR. The antennas in 5GNR radio 701 are wirelessly coupled to UE 401 over a 5GNR link. Transceivers in 5GNR radio 701 are coupled to transceivers in node circuitry 702. Transceivers in node circuitry 702 are coupled to transceivers in AMF 415 and UPF 417. The CPU in node circuitry 702 executes the operating systems, user applications, and network applications to exchange network signaling and user data with UE 401, AMF 415 and UPF 417.

Figure 8:
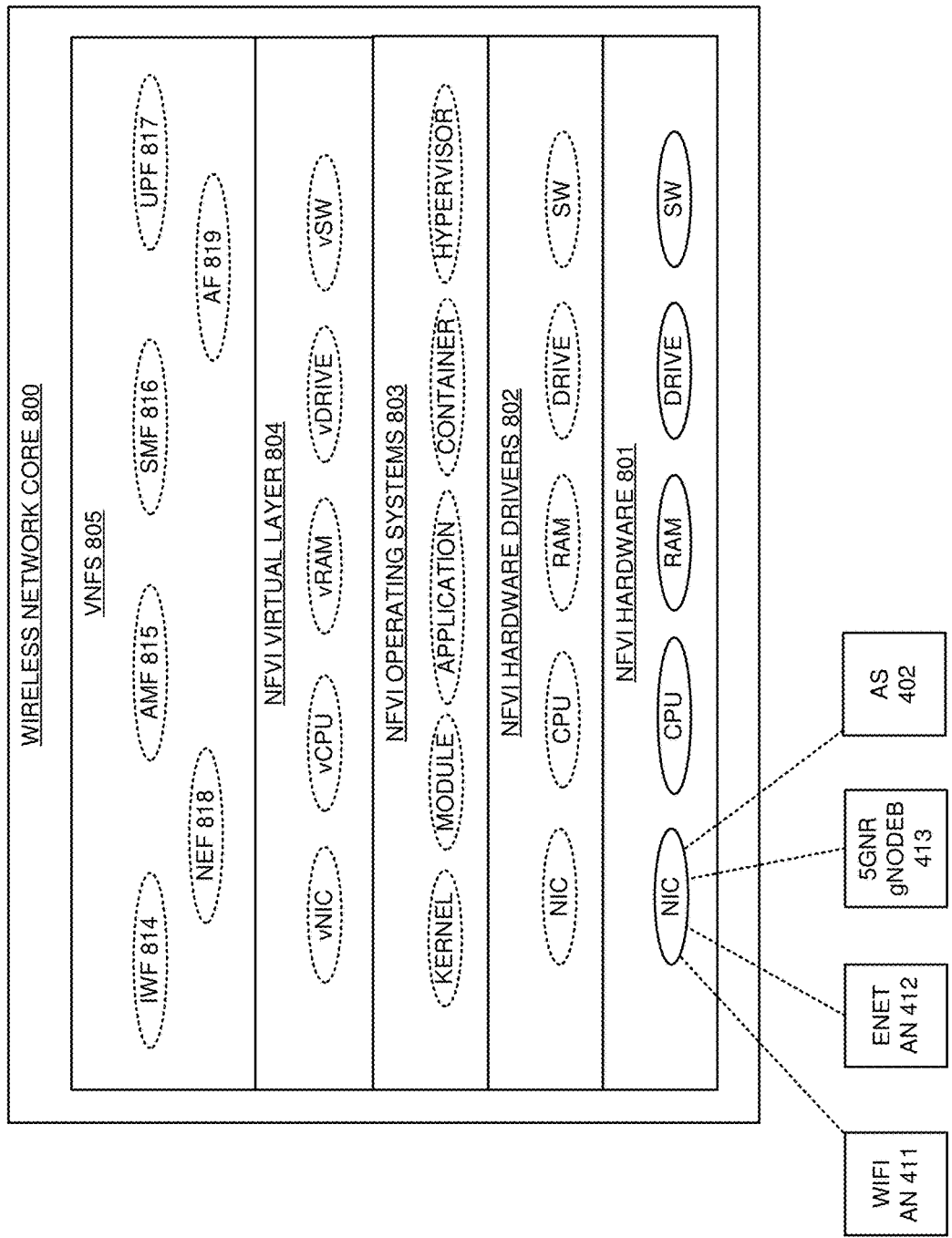
FIG. 8 illustrates a wireless network core in the 5G wireless communication network.

FIG. 8 illustrates wireless network core 800 in 5G wireless communication network 400. Wireless network core 800 comprises an example of wireless communication network 100, although network 100 may differ. Wireless network core 800 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise IWF 814, AMF 815, SMF 816, UPF 817, NEF 818, and AF 819. Other VNFs like Authentication Server Function (AUSF) and Network Repository Function (NRF) are typically present but are omitted for clarity. Wireless network core 800 may be located at a single site or be distributed across multiple geographic locations. The NIC transceivers in NFVI hardware 801 are coupled to WIFI AN 411, ENET AN 412, 5GNR gNodeB 413, and AS 402. NFVI hardware 801 executes NFVI hardware drivers 802, NFVI operating systems 803, NFVI virtual layer 804, and NFVI VNFs 805 to form and operate IWF 414, AMF 415, SMF 416, UPF 417, NEF 418, and AF 419.

Figure 9:
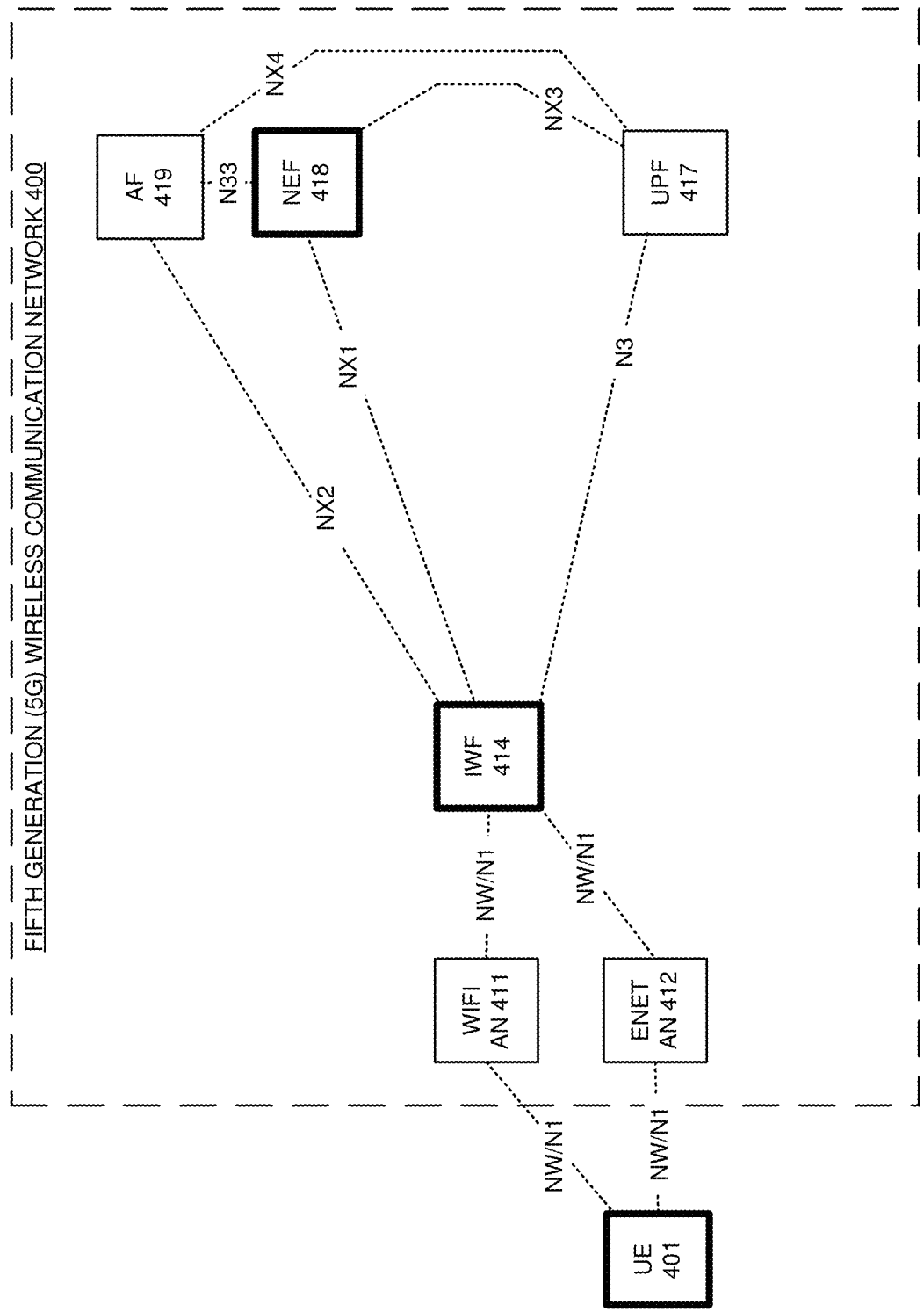
FIG. 9 illustrates an exemplary operation of the 5G wireless communication network to serve the UEs over the 3GPP NEF.

FIG. 9 illustrates an exemplary operation of 5G wireless communication network 400 to serve UE 401 over 3GPP NEF 418. The operation may differ in other examples. UE 401 generates NEF API calls that have UE data. In this example, UE 401 transfers the NEF API calls to NEF 418 over IWF 414. The following paths are available:

UE 401-AN 411/412-IWF 414-NEF 418,
UE 401-AN 411/412-IWF 414-AF 419-NEF 418,
UE 401-AN 411/412-IWF 414-UPF 417-NEF 418, and
UE 401-AN 411/412-IWF 414-UPF 417-AF 419-NEF 418.

IWF 414 may interwork the API calls between NW and NX1—where NX1 represents a suitable reference point for IWF-NEF communications. IWF 414 may interwork the API calls between NW and NX2—where NX2 represents a suitable reference point for IWF-AF communications. AF 419 may interwork the API calls between NX2 and N33. UPF 417 may interwork the API calls between N3 and NX3, where NX3 is a suitable reference point for UPF-NEF communications. UPF 417 may interwork the API calls between N3 and NX4, where NX4 is a suitable reference point for UPF-AF communications.

IWF 414 authenticates the identity of UE 401 and authorizes UE 401 for NEF API service—typically with the support of AMF 415 or a Unified Data Management (UDM). IWF 414 may select a Data Network Name (DNN) that includes NEF 418 and/or a wireless network slice that includes UPF 417 and AF 419—typically with the support of AMP 415, UDM, or a Network Slice Selection Function (NSSF).

Figure 10:
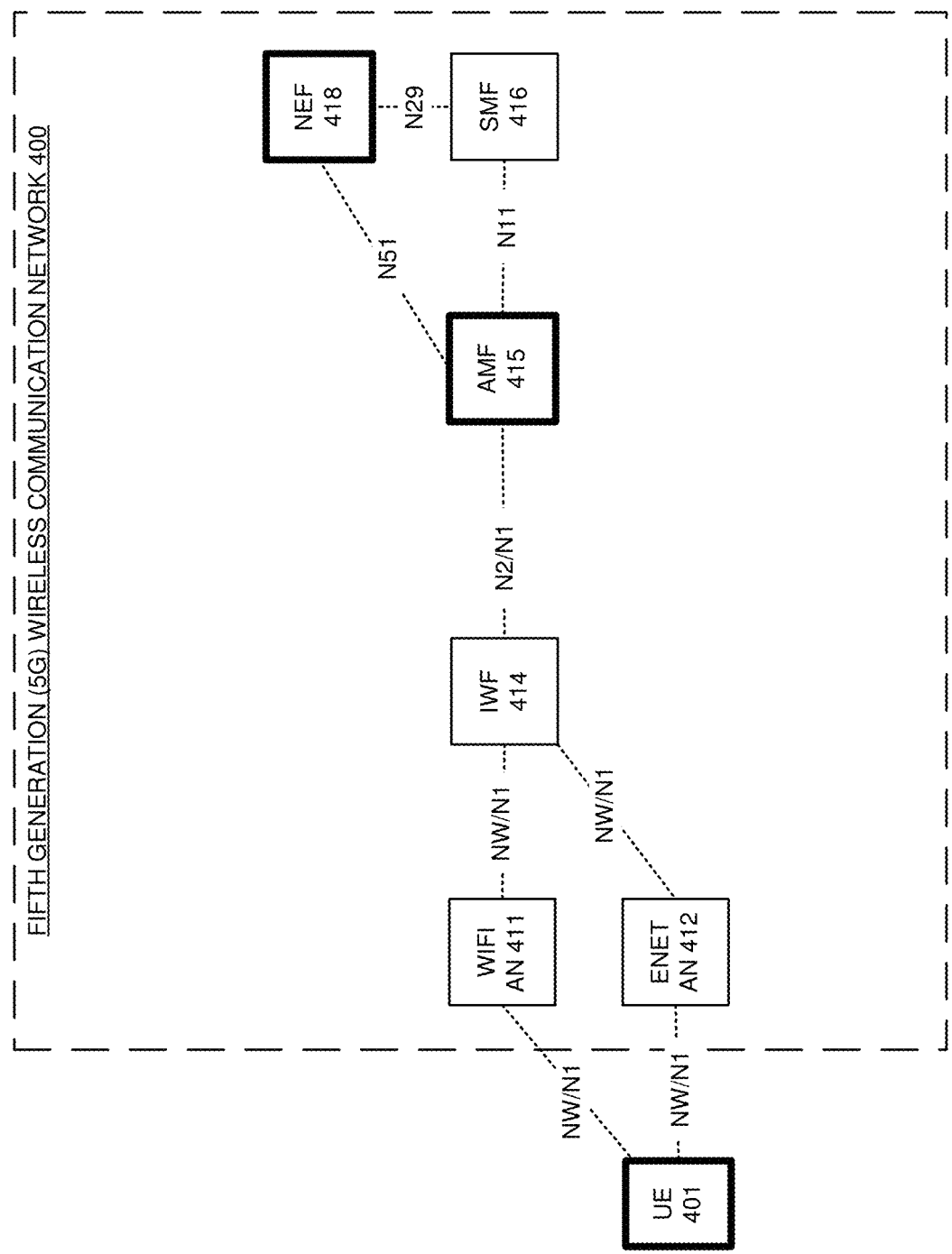
FIG. 10 illustrates an exemplary operation of the 5G wireless communication network to serve the UEs over the 3GPP NEF.

FIG. 10 illustrates an exemplary operation of 5G wireless communication network 400 to serve UE 401 over 3GPP NEF 418. The operation may differ in other examples. In this example, UE 401 transfers the NEF API calls to NEF 418 over both IWF 414 and AMF 415. The following paths are available:

UE 401-AN 411/412-IWF 414-AMF 415-NEF 418, and
UE 401-AN 411/412-IWF 414-AMF 415-SMF 416-NEF 418.

AMF 415 may interwork the API calls between N1 and N51. AMF 415 may interwork the API calls between N1 and N11, and SMF 416 may interwork the API calls between N11 and N29.

UE 401 may transfer the NEF API calls in Non-Access Stratum (NAS) files that traverse the 3GPP N1 link between UE 401 and AMF/SMF 414-415. AMF 415 authenticates the identity of UE 401 and authorizes UE 401 for the API service—typically with the support of a UDM. AMF 415 may select a DNN that includes SMF 415 and NEF 418.

Figure 11:
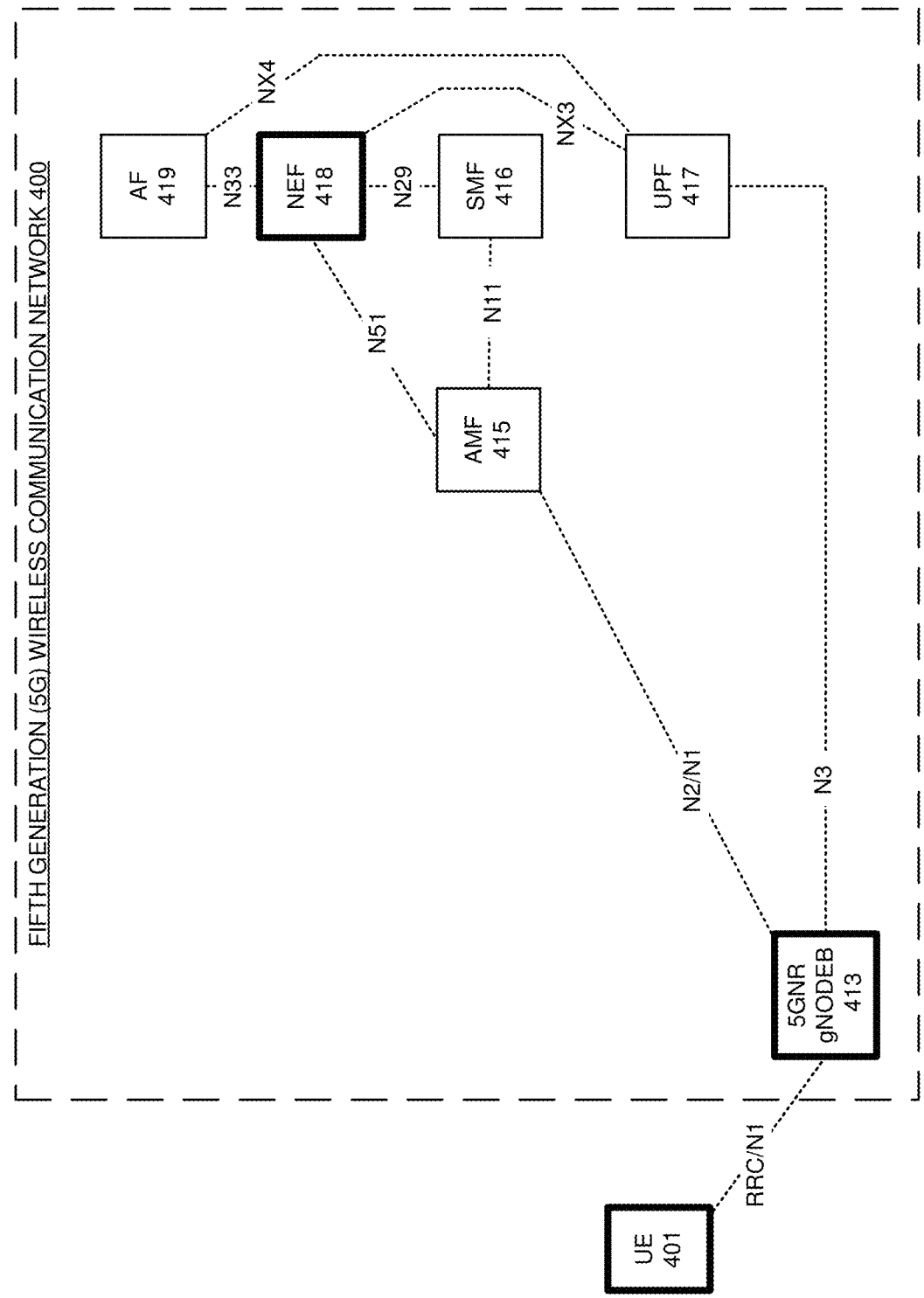
FIG. 11 illustrates an exemplary operation of the 5G wireless communication network to serve the UEs over the 3GPP NEF.

FIG. 11 illustrates an exemplary operation of 5G wireless communication network 400 to serve UE 401 over 3GPP NEF 418. The operation may differ in other examples. In this example, UE 401 transfers the NEF API calls to NEF 418 over 5GNR gNodeB 413. The following paths are available.

UE 401-gNodeB 413-UPF 417-NEF 418,
UE 401-gNodeB 413-UPF 417-AF 419-NEF 418,
UE 401-gNodeB 413-AMF 415-NEF 418, and
UE 401-gNodeB 413-AMF 415-SMF 416-NEF 418.

5GNR gNodeB 513 may interwork the API calls between RRC and N3. UPF 417 may interwork the API calls between N3 and NX3, where NX3 is a suitable reference point for UPF-NEF communications. UPF 417 may interwork the API calls between N3 and NX4, where NX4 is a suitable reference point for UPF-AP communications. AMF 415 may interwork the API calls between N1 and N51. AMF 415 may interwork the API calls between N1 and N11, and SMF 416 may interwork the API calls between N11 and N29.

UE 401 may transfer the NEF API calls in NAS files that traverse the 3GPP N1 link between UE 401 and AMF/SMF 414-415. AMF 415 authenticates the identity of UE 401 and authorizes UE 401 for the API service—typically with the support of a UDM. AMF 415 may select a DNN that includes SMF 416 and NEF 418 and/or wireless network slice that includes UPF 417 and AF 419.

The wireless data network circuitry described above comprises computer hardware and software that form special-purpose networking circuitry to serve UEs over NEFS. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve to serve UEs over NEFS.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve User Equipment (UEs) over a Third Generation Partnership Project (3GPP) Network Exposure Function (NEF), the method comprising:
   a non-3GPP Interworking Function (IWF) receiving NEF Application Programming Interface (API) calls that have UE data from the UEs over non-3GPP access nodes;
   the non-3GPP IWF transferring the NEF API calls that have the UE data to the 3GPP NEF;
   the 3GPP NEF receiving the NEF API calls that have the UE data from the non-3GPP IWF;
   the 3GPP NEF exposing the UE data to an Application Functions (AF) in response to the NEF API calls; and
   the AF transferring the UE data to an Application Server (AS) associated with the UEs.

2. The method of claim 1 wherein: the non-3GPP IWF receiving the NEF API calls having UE data from the UEs over the non-3GPP access nodes comprises receiving Non-Access Stratum (NAS) files that include the NEF API calls that have UE data from the UEs over the non-3GPP access nodes; and the UE data comprises at least one of UE monitoring data, device triggering data, background data, provisioning data, packet flow description management data, traffic influence data, chargeable party control data, and NEF session quality data.

3. The method of claim 1 wherein the non-3GPP IWF receiving the NEF API calls having UE data from the UEs over the non-3GPP access nodes comprises receiving the NEF API calls that have UE data from the UEs over 3GPP N1 links that traverse the non-3GPP access nodes.

4. The method of claim 1 wherein:
the non-3GPP IWF transferring the NEF API calls that have the UE data to the 3GPP NEF comprises transferring the NEF API calls that have the UE data to a 3GPP Access and Mobility Management Function (AMF) and the 3GPP AMF transferring the NEF API calls that have the UE data to the 3GPP NEF; and
the 3GPP NEF receiving the NEF API calls that have the UE data from the non-3GPP IWF comprises receiving the 3GPP NEF API calls that have the UE data from the 3GPP AMF.

5. The method of claim 1 wherein:
the non-3GPP IWF transferring the NEF API calls that have the UE data to the 3GPP NEF comprises transferring the NEF API calls that have the UE data to a 3GPP Access and Mobility Management Function (AMF), the 3GPP AMF transferring the NEF API calls that have the UE data to a 3GPP Session Management Function (SMF), and the 3GPP SMF transferring the NEF API calls that have the UE data to the 3GPP NEF, and
the 3GPP NEF receiving the NEF API calls that have the UE data from the non-3GPP IWF comprises receiving the NEF API calls that have the UE data from the 3GPP SMF.

6. The method of claim 1 wherein:
the non-3GPP IWF transferring the NEF API calls that have the UE data to the 3GPP NEF comprises transferring the NEF API calls that have the UE data to a 3GPP User Plane Function (UPF) and the 3GPP UPF transferring the NEF API calls that have the UE data to the 3GPP NEF; and
the 3GPP NEF receiving the NEF API calls that have the UE data from the non-3GPP IWF comprises receiving the NEF API calls that have the UE data from the 3GPP UPF.

7. The method of claim 1 wherein:
the non-3GPP IWF transferring the NEF API calls that have the UE data to the 3GPP NEF comprises transferring the NEF API calls that have the UE data over a direct IWF-to-NEF link; and
the 3GPP NEF receiving the NEF API calls that have the UE data from the non-3GPP IWF comprises receiving the NEF API calls that have the UE data over the direct IWF-to-NEF link.

8. The method of claim 1 further comprising:
at least one of the non-3GPP IWF, a 3GPP Access and Mobility Management Function (AMF), a 3GPP Session Management Function (SMF), and a 3GPP User Plane Function (UPF) authorizing the UE for the NEF API calls that have the UE data; and wherein:
the 3GPP NEF receiving the NEF API calls that have the UE data from the non-3GPP IWF comprises receiving the NEF API calls that have the UE data in response to the authorization.

9. The method of claim 1 wherein the non-3GPP IWF transferring the NEF API calls that have the UE data to the 3GPP NEF comprises the non-3GPP IWF transferring the NEF API calls that have the UE data to the 3GPP NEF over a wireless network slice that is configured to transfer the NEF API calls from the UE to the 3GPP NEF.

10. The method of claim 1 wherein the non-3GPP IWF transferring the NEF API calls that have the UE data to the 3GPP NEF comprises the non-3GPP IWF transferring the NEF API calls that have the UE data to the 3GPP NEF over a Data Network Name (DNN) configured to transfer the NEF API calls from the UE to the 3GPP NEF.

11. A wireless communication network to serve User Equipment (UEs) over Third Generation Partnership Project (3GPP) Network Exposure Function (NEF) circuitry, the wireless communication network comprising: non-3GPP Interworking Function (IWF) circuitry configured to: receive NEF Application Programming Interface (API) calls that have UE data from the UEs over non-3GPP access nodes; and transfer the NEF API calls that have the UE data to the 3GPP NEF circuitry; and the 3GPP NEF circuitry configured to: receive the NEF API calls that have the UE data from the non-3GPP IWF circuitry; and expose the UE data to Application Function (AF) circuitry in response to the NEF API calls; and the AF circuitry configured to: transfer the UE data to an Application Server (AS) associated with the UEs.

12. The wireless communication network of claim 11 wherein: the non-3GPP IWF circuitry is configured to receive Non-Access Stratum (NAS) files that include the NEF API calls that have UE data from the UEs over the non-3GPP access nodes; and the UE data comprises at least one of UE monitoring data, device triggering data, background data, provisioning data, packet flow description management data, traffic influence data, chargeable party control data, and NEF session quality data.

13. The wireless communication network of claim 11 wherein the non-3GPP IWF circuitry is configured to receive the NEF API calls that have UE data from the UEs over 3GPP N1 links that traverse the non-3GPP access nodes.

14. The wireless communication network of claim 11 wherein:
the non-3GPP IWF circuitry is configured to transfer the NEF API calls that have the UE data to 3GPP Access and Mobility Management Function (AMF) circuitry; and further comprising:
the 3GPP AMF circuitry configured to transfer the NEF API calls that have the UE data to the 3GPP NEF circuitry; and wherein;
the 3GPP NEF circuitry is configured to receive the 3GPP NEF API calls that have the UE data from the 3GPP AMF circuitry.

15. The wireless communication network of claim 11 wherein:
the non-3GPP IWF circuitry is configured to transfer the NEF API calls that have the UE data to 3GPP Access and Mobility Management Function (AMF) circuitry; and further comprising:
the 3GPP AMF circuitry configured to transfer the NEF API calls that have the UE data to 3GPP Session Management Function (SMF) circuitry;
the 3GPP SMF circuitry configured to transfer the NEF API calls that have the UE data to the 3GPP NEF circuitry; and wherein:
the 3GPP NEF circuitry is configured to receive the NEF API calls that have the UE data from the 3GPP SMF circuitry.

16. The wireless communication network of claim 11 wherein:

the non-3GPP IWF circuitry is configured to transfer the NEF API calls that have the UE data to 3GPP User Plane Function (UPF) circuitry; and further comprising:
the 3GPP UPF circuitry configured to transfer the NEF API calls that have the UE data to the 3GPP NEF circuitry; and wherein:
the 3GPP NEF circuitry is configured to receive the NEF API calls that have the UE data from the 3GPP UPF circuitry.

17. The wireless communication network of claim 11 wherein:
the non-3GPP IWF circuitry is configured to transfer the NEF API calls that have the UE data over a direct IWF-to-NEF link; and
the 3GPP NEF circuitry is configured to receive the NEF API calls that have the UE data over the direct IWF-to-NEF link.

18. The wireless communication network of claim 11 further comprising:
at least one of the non-3GPP IWF circuitry, a 3GPP Access and Mobility Management Function (AMF) circuitry, a 3GPP Session Management Function (SMF) circuitry, and a 3GPP User Plane Function (UPF) circuitry configured to authorize the UE for the NEF API calls that have the UE data; and wherein:
the 3GPP NEF circuitry is configured to receive the NEF API calls that have the UE data in response to the authorization.

19. The wireless communication network of claim 11 wherein the non-3GPP IWF circuitry is configured to transfer the NEF API calls that have the UE data to the 3GPP NEF circuitry over a wireless network slice that is configured to transfer the NEF API calls from the UE to the 3GPP NEF circuitry.

20. The wireless communication network of claim 11 wherein the non-3GPP IWF circuitry is configured to transfer the NEF API calls that have the UE data to the 3GPP NEF circuitry over a Data Network Name (DNN) configured to transfer the NEF API calls from the UE to the 3GPP NEF circuitry.

* * * * *